United States Patent
Choi et al.

(10) Patent No.: US 11,296,324 B2
(45) Date of Patent: Apr. 5, 2022

(54) ROTAXANE POLYMER BINDER FOR LITHIUM SECONDARY BATTERY, ELECTRODE COMPRISING SAME, AND SECONDARY BATTERY COMPRISING SAME

(71) Applicant: KOREA ADVANCED INSTITUTE OF SCIENCE AND TECHNOLOGY, Daejeon (KR)

(72) Inventors: Jang Wook Choi, Daejeon (KR); Ali Coskun, Daejeon (KR); Sung Hun Choi, Daejeon (KR); Tae Woo Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 6 days.

(21) Appl. No.: 16/469,329

(22) PCT Filed: Dec. 6, 2017

(86) PCT No.: PCT/KR2017/014249
§ 371 (c)(1),
(2) Date: Jun. 13, 2019

(87) PCT Pub. No.: WO2018/124527
PCT Pub. Date: Jul. 5, 2018

(65) Prior Publication Data
US 2020/0112027 A1  Apr. 9, 2020

(30) Foreign Application Priority Data
Dec. 28, 2016 (KR) .................. 10-2016-0181036

(51) Int. Cl.
| | | |
|---|---|---|
| *H01M 4/62* | (2006.01) | |
| *H01M 4/131* | (2010.01) | |
| *H01M 4/133* | (2010.01) | |
| *H01M 4/136* | (2010.01) | |
| *H01M 10/0525* | (2010.01) | |
| *C08G 83/00* | (2006.01) | |
| *H01M 4/134* | (2010.01) | |
| *H01M 10/052* | (2010.01) | |

(52) U.S. Cl.
CPC .......... *H01M 4/622* (2013.01); *C08G 83/006* (2013.01); *C08G 83/007* (2013.01); *H01M 4/131* (2013.01); *H01M 4/133* (2013.01); *H01M 4/134* (2013.01); *H01M 4/136* (2013.01); *H01M 10/052* (2013.01); *H01M 10/0525* (2013.01)

(58) Field of Classification Search
CPC .. H01M 4/622; H01M 10/0525; H01M 4/136; H01M 4/133; H01M 4/131
USPC .......................................... 536/53
See application file for complete search history.

(56) References Cited

U.S. PATENT DOCUMENTS 5,538,655 A  7/1996 Fauteux et al.

FOREIGN PATENT DOCUMENTS

| JP | 2003-257236 A | 9/2003 | |
|---|---|---|---|
| JP | 5493204 B2 | 5/2014 | |
| JP | WO 2015/147282 | * 10/2015 | ........ H01M 10/0562 |
| JP | 2015-191866 | * 11/2015 | |
| JP | 2015-191866 A | 11/2015 | |
| WO | WO 2013/099224 A1 | 7/2013 | |

OTHER PUBLICATIONS

Nakahata et al. Self-Healing Materials Formed by Cross-Linked Polyrotaxanes with Reversible Bonds. Chem 1, 766-775, Nov. 10, 2016. (Year: 2016).*
Kamitori, Shigehiro, et al. "A Novel Pseudo-Polyrotaxane Structure Composed of Cyclodextrins and a Straight-Chain Polymer: Crystal Structures of Inclusion Complexes of 3-Cyclodextrin with Poly (trimethylene oxide) and Poly (propylene glycol)", Macromolecules, vol. 33, Issue 5, Mar. 2000 (pp. 1500-1502).
Choi, Sunghun, et al. "Highly elastic binders integrating polyrotaxanes for silicon microparticle anodes in lithium ion batteries", Science, vol. 357, Issue 6348, Jul. 2017 (pp. 279-283).
International Search Report dated Oct. 11, 2018 in counterpart International Patent Application No. PCT/KR2017/014249 (4 pages in English and 4 pages in Korean).

\* cited by examiner

Primary Examiner — Yih-Horng Shiao
(74) Attorney, Agent, or Firm — NSIP Law

(57) ABSTRACT

The present disclosure provides a rotaxane polymer binder containing a polymer based on a rotaxane structure. The polymer binder may further contain a polymer cross-linked with a polar polymer. The polar polymer may be a polymer containing the element F, O or N in a functional group and having high polarity.
In addition, the present disclosure provides an electrode containing the rotaxane polymer binder as a binder for a lithium secondary battery, and a secondary battery containing the electrode.

12 Claims, 10 Drawing Sheets

[FIG. 1]
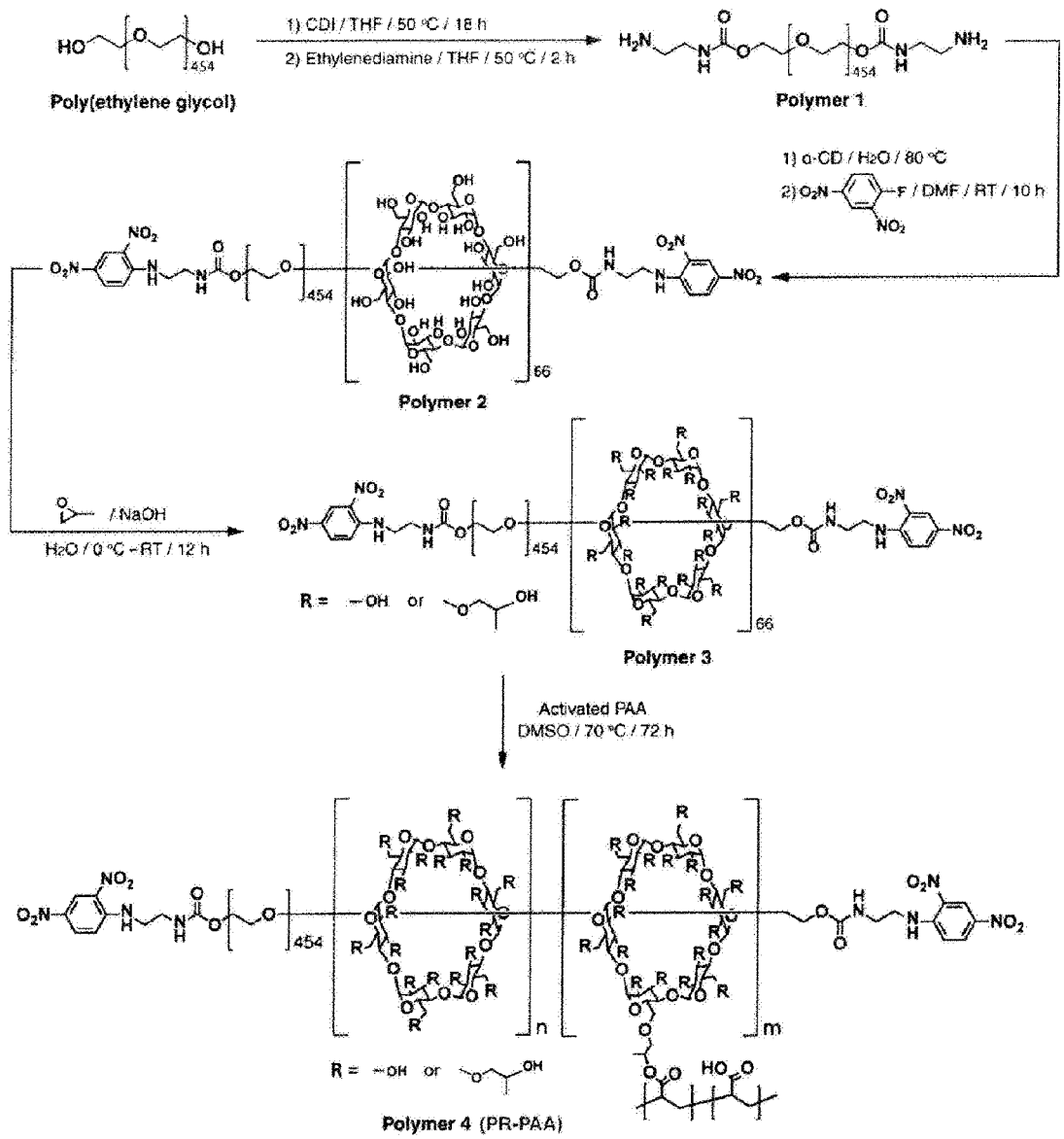

[FIG. 2]
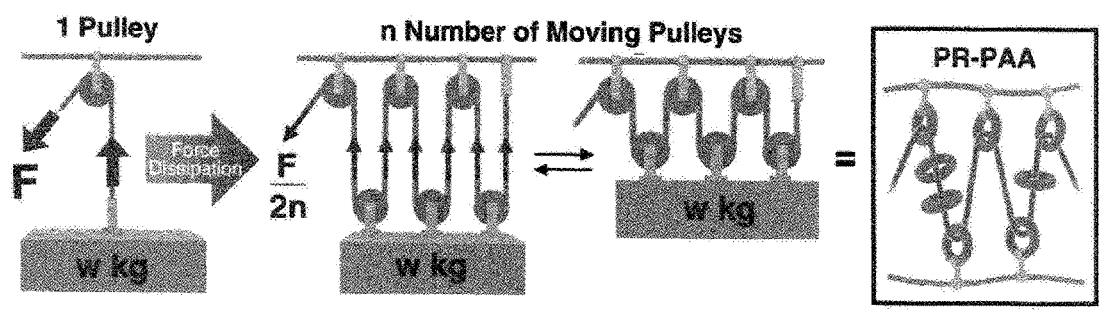
[FIG. 3]
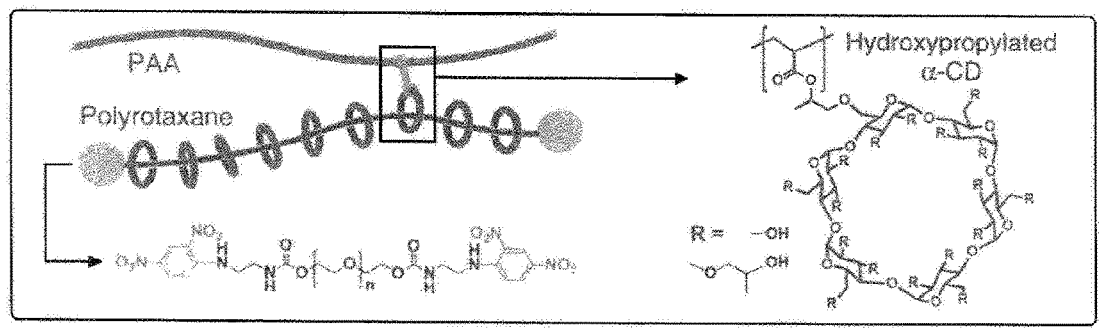

[FIG. 4]
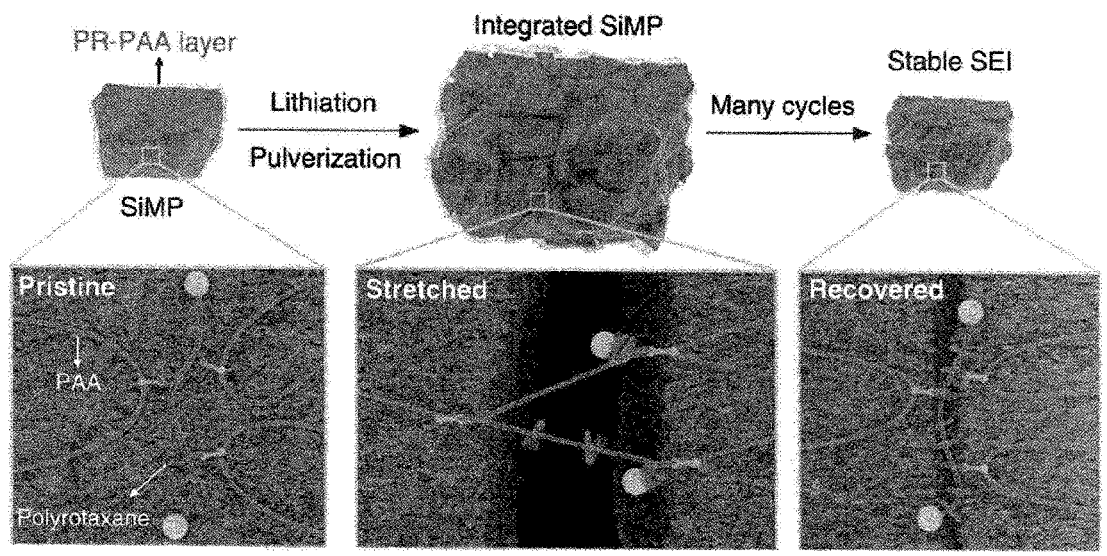
[FIG. 5]
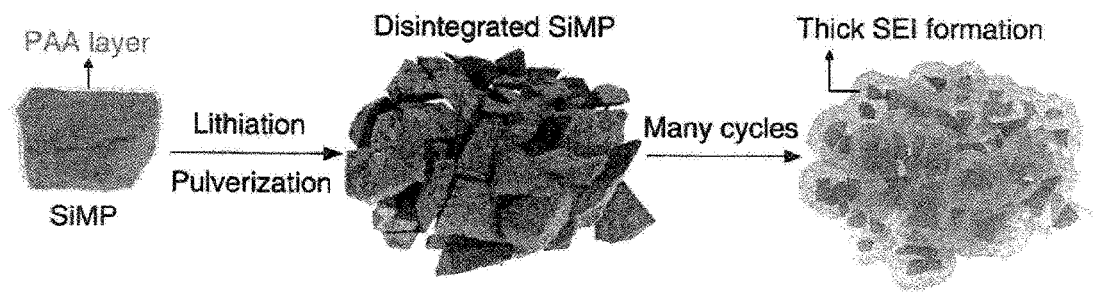

[FIG. 6]
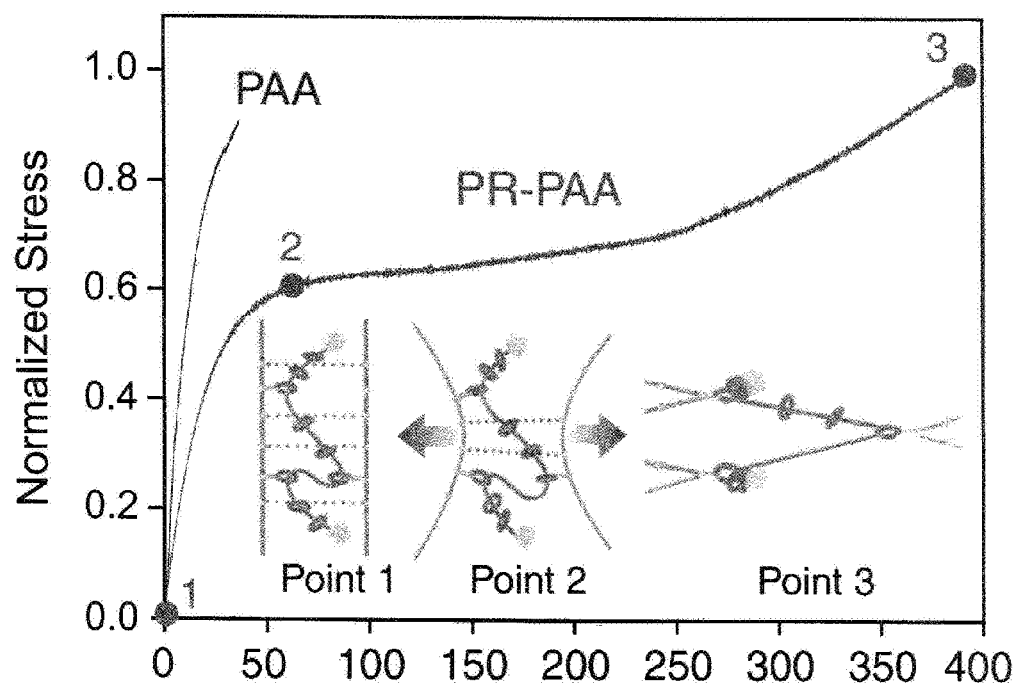

[FIG. 7]
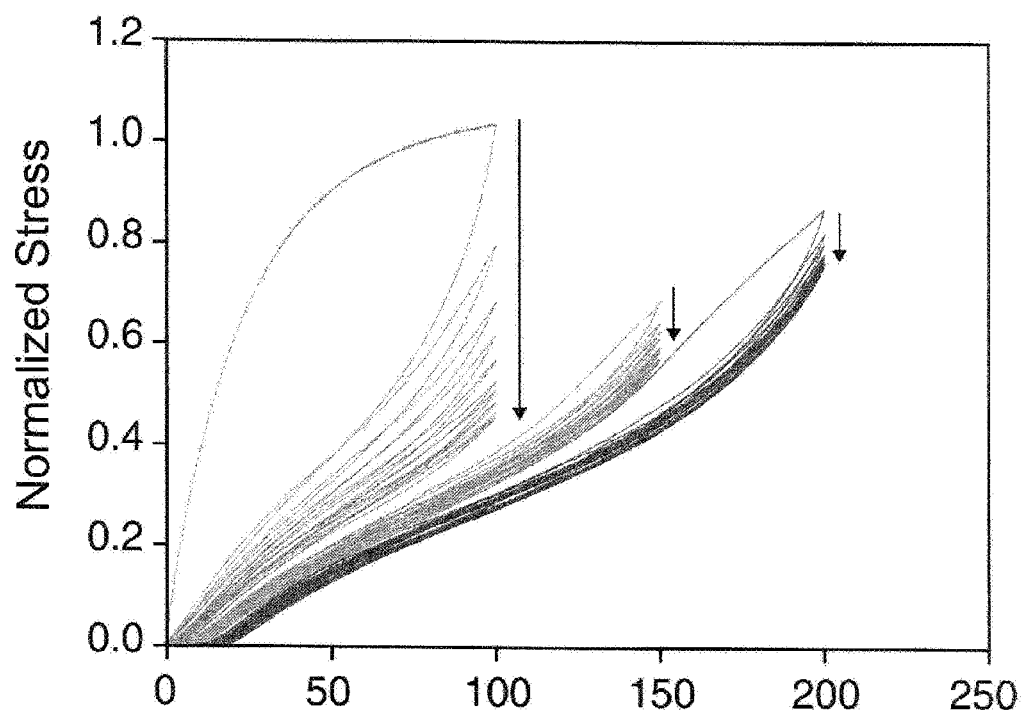

[FIG. 8]
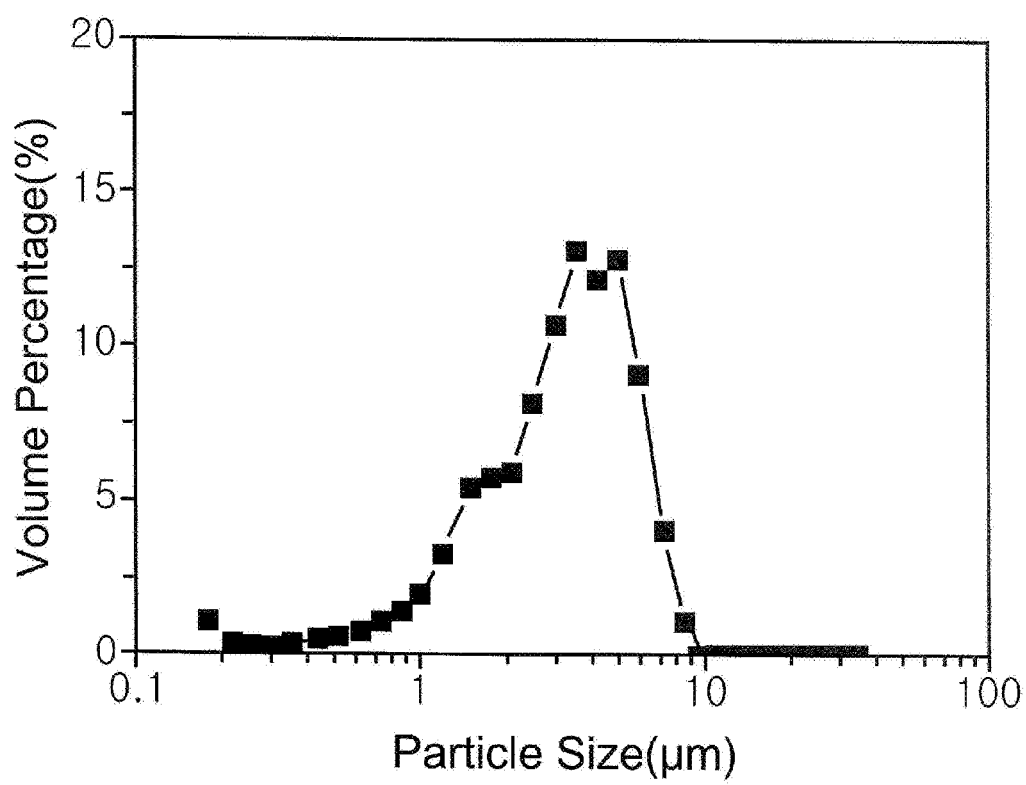

[FIG. 9]
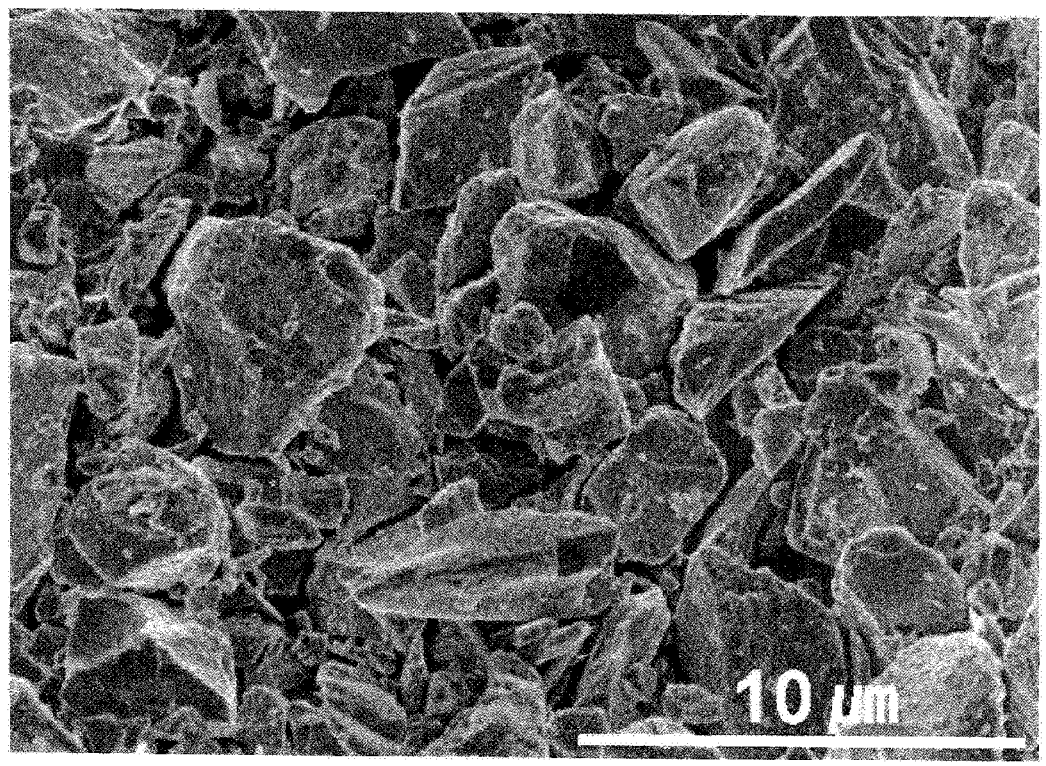

[FIG. 10]
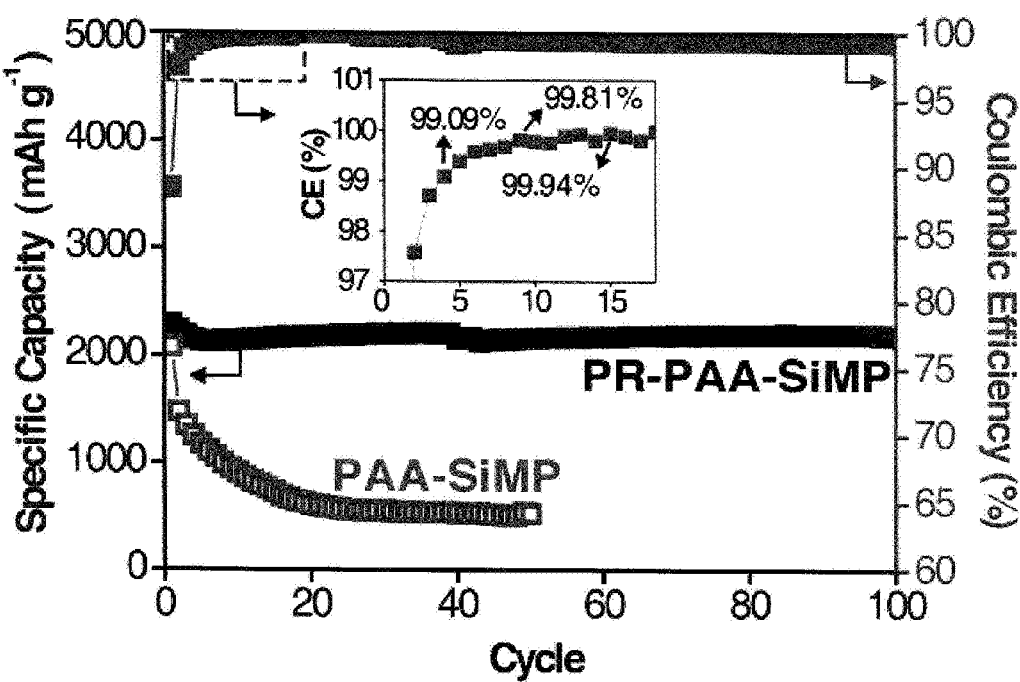

[FIG. 11]
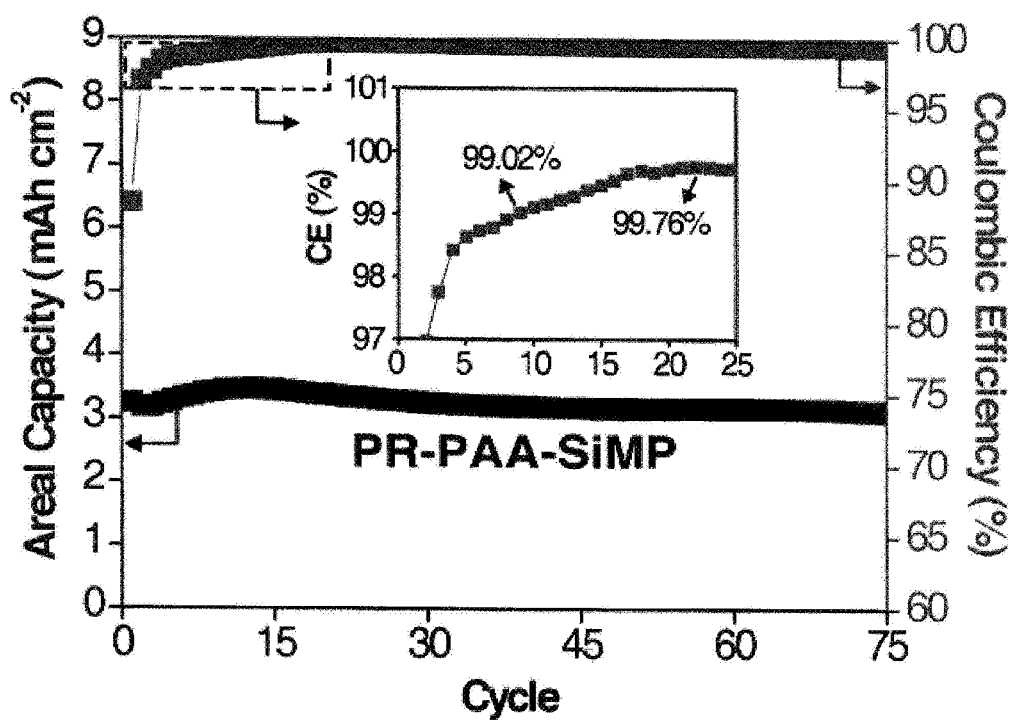

[FIG. 12]
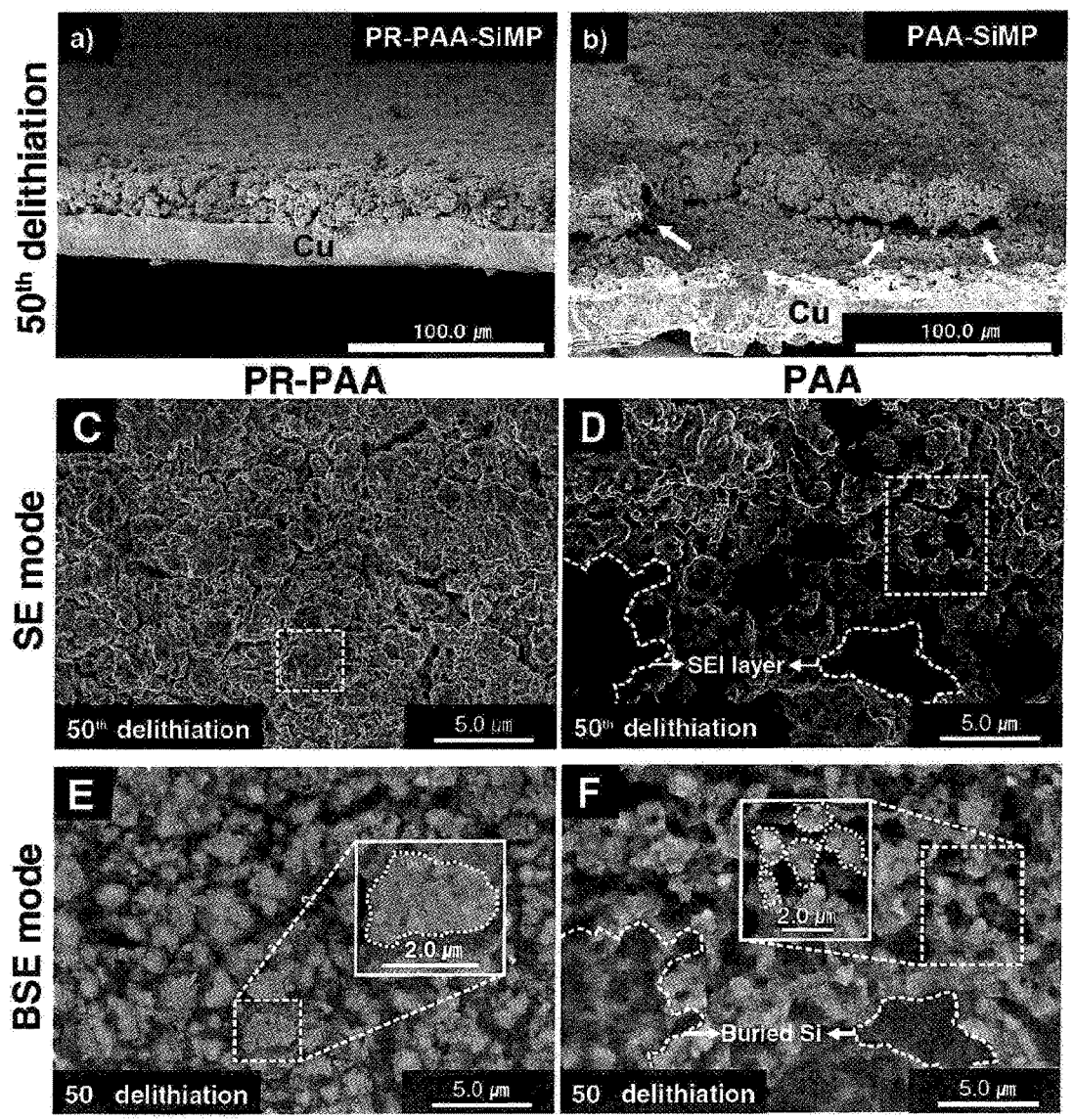

ROTAXANE POLYMER BINDER FOR LITHIUM SECONDARY BATTERY, ELECTRODE COMPRISING SAME, AND SECONDARY BATTERY COMPRISING SAME

CROSS REFERENCE TO RELATED APPLICATIONS

This application is a U.S. National Stage Application of International Application No. PCT/KR2017/014249, filed on Dec. 6, 2017, which claims the benefit under 35 USC 119(a) and 365(b) of Korean Patent Application No. 10-2016-0181036, filed on Dec. 28, 2016, in the Korean Intellectual Property Office, the entire disclosure of which is incorporated herein by reference for all purposes.

TECHNICAL FIELD

The present disclosure relates to a polymer binder for a lithium secondary battery, more particularly to a method for preparing a commercially available polymer binder by using a rotaxane, thereby minimizing damage due to the volume change of an electrode, a polymer binder prepared thereby, and an electrode and a secondary battery containing the same.

BACKGROUND ART

Recently, the demand on electric vehicles is soaring in relation to ecofriendly (green) energy and smart car issues. The lithium secondary batteries currently used mainly as small batteries in portable electronic devices are expected to be the core power source of electric vehicles in the future due to their superiority. But, the use of the small battery-based technology applied to electric vehicles is disadvantageous in competition with the current gasoline vehicles due to short mileage and high price. Thus, an innovative strategy is required to overcome this problem. Therefore, interests in new electrode materials having high energy density are soaring.

The current commercially available graphite negative electrode material is already used mainly for small secondary batteries in a variety of electronics products due to stable cycle characteristics and efficiency. However, because of the problem of low theoretical capacity with the maximum available capacity of 372 mAh/g, application to medium- to large-sized secondary batteries for electric vehicles is limited. Recently, various metal-based materials are drawing attentions as high-capacity negative electrode materials for replacing the carbon-based negative electrode materials. In particular, silicon attracts attention as a next-generation negative electrode material because of the theoretical capacity of 4200 mAh/g, which is more than 10 times higher as compared to the existing graphite negative electrode materials.

However, the silicon negative electrode material fails exert sufficient life characteristics due to problems such as micronization, delamination, interfacial instability, etc. caused by 300% of volume expansion/contraction during charging and discharging. To solve this problem fundamentally, a stable electrode structure should be maintained despite the repeated volume change. It is known that the polymer binder in the electrode plays a pivotal role in maintaining the structure. Because PVDF or SBR/CMC, which are currently used as commercially available binders, is susceptible to volume change, a silicon binder maintaining superior adhesivity despite the volume change, more broadly a binder that can effectively control the volume change of the electrode, is required.

DISCLOSURE

Technical Problem

The present disclosure is directed to providing a polymer binder capable of maintaining a stable electrode structure despite repeated volume change and having excellent adhesion property, and an electrode and a secondary battery containing the same.

Technical Solution

The present disclosure provides a rotaxane polymer binder containing a polymer based on a rotaxane structure.

The rotaxane polymer binder may further contain a polymer cross-linked with a polar polymer, wherein the polar polymer refers to a polymer containing the element F, O or N in the functional group and having high polarity. Specifically, it can contain at least one selected from —F, —C(=O) OH, —COO$^+$M$^-$ (M=Li$^+$, Na$^+$, Mg$^{2+}$, K$^+$, Ca$^{2+}$, Sr$^+$, Cs$^+$), —C(=O)OR, —CH(=O), —OH, —OR, C$_6$H$_4$(OH)$_2$ (catechol), —C≡N, —C(=O)NH, —NHC(=O)O—, —NHC(=O)NH—, —RC(=O)NRC(=O)R— and —NH$_2$.

The rotaxane polymer binder may further contain a polymer cross-linked with a nonpolar polymer, wherein the nonpolar polymer contains carbon (C) and hydrogen (H) elements in the functional group and has low polarity.

As the polymer based on a rotaxane structure, one selected from a rotaxane, a pseudorotaxane, a polyrotaxane and a pseudopolyrotaxane may be used.

The rotaxane may be a supramolecular structure containing a ring molecule, a string polymer with the ring molecule inserted, and a stopper for preventing dissociation of the ring molecule.

The pseudorotaxane may be a supramolecular structure containing a ring molecule, and a string polymer with the ring molecule inserted.

The polyrotaxane may be a supramolecular structure containing two or more ring molecules, a string polymer with the ring molecules inserted, and a stopper for preventing dissociation of the ring molecules.

The pseudopolyrotaxane may be a supramolecular structure containing two or more ring molecules and a string polymer with the ring molecules inserted.

Specifically, the ring molecule may be at least one selected from a polysaccharide main chain-based cyclodextrin, an ether main chain-based crown ether, and an aromatic molecule-based calixarene molecule.

The string polymer may be a linear-type, branched-type, graft-type, dendrimer-type, or network-type polymer, and may be at least one selected from an ether (—O—), a hydrocarbon (—CH$_2$—, —CR$_2$—), an aromatic (—C$_6$H$_4$—), a siloxane (—Si—O—), and a conductive polymer such as polyaniline (—C$_6$H$_4$N—) or poly-3,4-ethylenedioxythiophene (PEDOT).

The stopper may be any molecule whose diameter is larger than the inner diameter of the ring molecule.

In addition, the present disclosure provides an electrode containing: the rotaxane polymer binder; and one or more of active material selected from a silicon composite, a tin composite, a germanium composite, a phosphorus composite, a lead composite, a sulfur composite, a zinc composite, an arsenic composite, a carbon-based material, a silicon oxide-based molecule ($SiO_x$, $0<x<2$), a metal oxide-based molecule, a metal sulfide-based molecule and a lithium metal oxide-based molecule.

These composites may contain active materials of each element.

The carbon-based material may include one or more selected from graphite, graphene, acetylene carbon, carbon nanotube, hard carbon and amorphous carbon.

One or more selected from the silicon oxide-based molecule, the metal oxide-based molecule, the metal sulfide-based molecule and the lithium metal oxide-based molecule may be used.

As the metal oxide-based molecule, one or more selected from $TiO_2$, $WO_2$, $FeO_2$, $Fe_2O_3$, $CoO_2$, $NiO$, $CuO$, $Cr_2O_3$, $MoO_2$, $MoO_3$, $Mn_3O_4$, $SnO$, $SnO_2$, $ZnO$, $In_2O_3$ and $Ag_2O$ may be used.

As the metal sulfide-based molecule, one or more selected from $TiS_2$ and $MoS_2$ may be used.

As the lithium metal oxide-based molecule, one or more selected from lithium manganese oxide, lithium cobalt oxide, lithium nickel manganese cobalt oxide, lithium nickel cobalt aluminum oxide, and lithium titanium oxide may be used.

A weight ratio of the binder:the active material particle may be 1:1 to 1000, and the active material particle may have a size of 0.001 μm to 100 μm.

In addition, the present disclosure provides a lithium secondary battery containing the electrode described above.

Advantageous Effects

A polymer binder containing a polyrotaxane according to the present disclosure can ensure battery performance at a commercializable level because it has a high area capacity of 3 $mAh/cm^2$ or higher, exhibits superior capacity retention and Coulombic efficiency, and effectively controls the volume change of an electrode caused by silicon even at a low binder content.

In addition, the binder is very advantageous for commercialization in terms of raw material cost because it is synthesized by adding a small amount of polyrotaxane to the existing commercial polar polymer binder.

BRIEF DESCRIPTION OF DRAWINGS

FIG. 1 schematically shows a synthesis procedure of a polyrotaxane-polyacrylic acid polymer in accordance with the present disclosure.

FIG. 2 illustrates the driving principle of a moving pulley.

FIG. 3 shows the chemical structure of a binder according to one embodiment of the present disclosure.

FIG. 4 illustrates the working principle of a silicon microparticle electrode.

FIG. 5 shows an electrode of Comparative Example using polyacrylic acid.

FIG. 6 shows a stretching test result for thin films of one embodiment of the present disclosure and Comparative Example.

FIG. 7 shows a stretching-compression test result for a polyrotaxane-polyacrylic acid polymer thin film according to one embodiment of the present disclosure.

FIG. 8 is a result of measuring the particle size distribution of a silicon microparticle according to one embodiment of the present disclosure.

FIG. 9 is a surface SEM image of a silicon microparticle according to one embodiment of the present disclosure.

FIG. 10 shows the cycle characteristic and Coulombic efficiency of an electrode 1 according to one embodiment of the present disclosure.

FIG. 11 shows the cycle characteristic and Coulombic efficiency of an electrode 2 according to one embodiment of the present disclosure.

FIG. 12 is an SEM image of an electrode in accordance with one embodiment of the present disclosure.

BEST MODEL

The present disclosure provides a rotaxane polymer binder containing a polymer based on a rotaxane structure.

The rotaxane polymer binder may further contain a polymer cross-linked with a polar polymer, wherein the polar polymer refers to a polymer containing the element F, O or N in the functional group and having a high polarity. Specifically, it includes —F, —C(=O)OH, —COO$^+$M$^-$ (M=Li$^+$, Na$^+$, Mg$^{2+}$, K$^+$, Ca$^{2+}$, Sr$^+$, Cs$^+$), —C(=O)OR, —CH(=O), —OH, —OR, $C_6H_4(OH)_2$ (catechol), —C≡N, —C(=O)NH, —NHC(=O)O—, —NHC(=O)NH—, —RC(=O)NRC(=O)R—, —NH$_2$, etc., but is not limited thereto.

The working principle of the polymer binder is very similar to that of a moving pulley. FIG. 2 illustrates the driving principle of a moving pulley. A moving pulley can lift an object easily with smaller force because force can be distributed evenly in proportion to the number of the pulleys. The force applied to a cable is decreased in proportion thereto. Assuming that the cable is the polymer binder and that the weight of the object is the stress caused by the volume expansion of silicon, the force applied to the binder is greatly reduced as compared to the actually applied stress. Due to this principle, the binder can withstand a greater force than it can normally do. In order to embody the moving pulley as a pulley molecule at the molecular level, a binder was synthesized using a rotaxane and a polar polymer. Its chemical structure is shown in FIG. 3.

As the polymer based on a rotaxane structure, one selected from a rotaxane, a pseudorotaxane, a polyrotaxane and a pseudopolyrotaxane may be used.

The rotaxane is a supramolecular structure consisting of a ring molecule and a string polymer penetrating it. Each end of the string polymer is blocked by a bulky molecule called a stopper which can prevent the ring molecule from exiting.

The pseudorotaxane is a supramolecular structure which consists of a ring molecule and a string polymer penetrating it and does not have a stopper at each end of the string polymer.

The polyrotaxane is a supramolecular structure which consists of two or more ring molecules and a string polymer penetrating therethrough. Each end of the string polymer is blocked by a bulky molecule called a stopper which can prevent the ring molecules from exiting.

The pseudopolyrotaxane is a supramolecular structure which consists of two or more ring molecules and a string polymer penetrating therethrough and does not have a stopper at each end of the string polymer.

Specifically, the ring molecule may be at least one selected from a polysaccharide main chain-based cyclodextrin, a polyol main chain-based crown ether, and an aromatic molecule-based calixarene-based molecule, but is not limited thereto.

The stopper may be any molecule whose diameter is larger than the inner diameter of the ring molecule.

The string polymer may be a linear-type polymer. More specifically, at least one selected from an ether (—O—), a hydrocarbon (—CH$_2$—, —CR$_2$—), an aromatic (—C$_6$H$_4$—), a siloxane (—Si—O—), and a conductive polymer such as polyaniline (—C$_6$H$_4$N—) or PEDOT may be used, although not being limited thereto.

The ring the molecule and polar polymer of the rotaxane, pseudorotaxane, polyrotaxane or pseudopolyrotaxane may be cross-linked by covalent bonding or non-covalent bonding (hydrogen bonding, ion-ion interaction, ion-dipole interaction, dipole-dipole interaction, π-π interaction, cation-π interaction, anion-T interaction, host-guest interaction, van der Waals interaction, or metal-ligand bonding) to result in a rotaxane polymer binder. Because the cross-linking points (cross-links) formed in accordance with the present disclosure are formed by crosslinking between the polymer (PAA in Example of the present disclosure described below) constituting the ring molecule of the rotaxane and the binder, they are not fixed but can slide along the polymer string during expansion, etc. of the binder polymer. Thus, the cross-linking points may give an effect of relieving stress during silicon volume expansion by acting as a molecular moving pulley.

In addition, the present disclosure provides an electrode for a lithium secondary battery containing the polymer binder described above.

As the active material of the electrode, a carbon (C)-based material, a silicon-containing composite (Si composite), tin (Sn), a tin-containing composite (Sn composite), germanium (Ge), a germanium-containing composite (Ge composite), phosphorus (P), a phosphorus-containing composite (P composite), lead (Pb), a lead-containing composite (Pb composite), sulfur (S), a sulfur-containing composite (S composite), zinc (Zn), a zinc-containing composite (Zn composite), arsenic (As), an arsenic-containing composite (As composite), a silicon oxide-based molecule (SiO$_x$, 0<x<2), a metal oxide-based molecule (e.g., TiO$_2$, WO$_2$, FeO$_2$, Fe$_2$O$_3$, CoO$_2$, NiO, CuO, Cr$_2$O$_3$, MoO$_2$, MoO$_3$, Mn$_3$O$_4$, SnO, SnO$_2$, ZnO, In$_2$O$_3$, Ag$_2$O) a metal sulfide (e.g., TiS$_2$, MoS$_2$), a lithium metal oxide (e.g., LMO (lithium manganese oxide), LCO (lithium cobalt oxide), NMC (lithium nickel manganese cobalt oxide), NCA (lithium nickel cobalt aluminum oxide), LTO (lithium titanium oxide), etc.) may be used, in addition to silicon particles, although not being limited thereto.

A weight ratio of the binder:the active material particle may be 1:1 to 1000. If the weight ratio is less than 1:1, capacity retention and Coulombic efficiency may decrease. And, if it exceeds 1:1000, it may be difficult to effectively control the volume change of the electrode caused by silicon.

Specifically, the diameter of the active material particles may be 0.001 μm to 100 μm. If the diameter is smaller than 0.001 μm or larger than 100 μm, capacity retention and Coulombic efficiency may decrease.

In addition, the present disclosure provides a lithium secondary battery containing the electrode described above.

MODE FOR INVENTION

Hereinafter, the present disclosure will be described in detail through drawings, examples and test examples so that those of ordinary skill can easily carry out the present disclosure. However, the present disclosure may be embodied in various different forms and the scope of the present disclosure is not limited by them.

(Example) Preparation of Polymer Binder, Electrode and Cell Using PR-PAA

Preparation of Polymer Binder

A polyrotaxane binder was prepared through a step of preparing a first polymer by mixing poly(ethylene glycol) with carbonyldiimidazole, a step of preparing a second polymer by mixing the first polymer with alpha-cyclodextrin, a step of preparing a third polymer by mixing the second polymer with propylene oxide, and a step of preparing polyrotaxane-polyacrylic acid (PR-PAA) by mixing the third polymer mixed in anhydrous dimethyl sulfoxide with a polyacrylic acid solvent.

In the step of preparing the first polymer, poly(ethylene glycol) (PEG, MW=~20,000) was sufficiently dried in a vacuum oven at 50° C. for 12 hours to remove water before the reaction was started. After adding 100 parts by weight of 0.5 mmol of poly(ethylene glycol) and 1-3 parts by weight of 1.2 mmol of carbonyldiimidazole to anhydrous THF (40 mL) and stirring at 50° C. for 18 hours, ethylenediamine (0.6 mL, 9.0 mmol) was added to the reaction solution and the mixture was stirred additionally for 2 hours at 50° C. In order to precipitate the polymer, ethanol (40 mL) was added at room temperature and the solution was kept for 2 hours in a freezer. After adding cold ethanol (100 mL) and stirring with a spatula, the solution was filtered under reduced pressure to obtain the first polymer in a white powder form.

In the step of preparing the second polymer, the first polymer was added to H$_2$O and dissolved sufficiently at 80° C. Then, alpha-cyclodextrin (α-CD) was added and the mixture was stirred for 30 minutes. 33-39 parts by weight of alpha-cyclodextrin was stirred with 8-10 parts by weight of the first polymer. After the stirring, the reaction solution was cooled to room temperature and kept overnight at 5° C. to obtain a precipitate as a white solid. The white precipitate was freeze-dried and 2,4-dinitrofluorobenzene was added to the dried polymer powder. Then, anhydrous N,N-dimethylformamide was added slowly while mixing with a spatula. The resulting yellow polymer was kept overnight at room temperature and then dissolved in dimethyl sulfoxide (DMSO, 50 mL). After performing dialysis using the DMSO, the dialyzed polymer was precipitated in water and then freeze-dried to obtain the second polymer.

In the step of preparing the third polymer, the second polymer was dissolved in 1 N aqueous NaOH and temperature was lowered to 0° C. After slowly adding 170-180 parts by weight of 307 mmol of propylene oxide to 10-30 parts by weight of the second polymer, the mixture was stirred for 12 hours. The stirred polymer was dialyzed with distilled water for 3 days and then freeze-dried. The freeze-dried polymer was stirred overnight after adding to CH$_2$Cl$_2$, and then filtered and dried to obtain the third polymer in a yellow powder form.

In the step of preparing the polyrotaxane-polyacrylic acid (PAA-PR), PAA (0.05 g·mL$^{-1}$), CDI (0.1 g·mL$^{-1}$) and a third polymer solution (0.1 g·mL$^{-1}$) were prepared. 0.1 g of the third polymer was mixed with 0.5-1.5 mL of anhydrous dimethyl sulfoxide. After mixing the PAA solvent (19 mL) and the solvent CDI (0.113 mL) at room temperature, the mixture was stirred at 50° C. under argon atmosphere for 12 hours. The PAA solvent was cooled to room temperature and the third polymer solvent (0.5 mL) solution was added. After stirring for 30 minutes at room temperature, the reaction mixture was stirred at 90° C. for 72 hours. After precipitating the stirred polymer in THF and then filtering, it was dissolved again in methanol (100 mL), precipitated in diethyl ether and then filtered. The filtered polymer was dissolved again in water and then freeze-dried to obtain the yellow PR-PAA polymer.

Preparation of Electrode

After preparing the polymer binder according to the method described above, a slurry was prepared by dispersing silicon microparticles, Super-P and the polymer binder at a weight ratio of 8:1:1 in a DMSO solvent. Then, an electrode containing the PR-PAA binder was prepared by casting the slurry on a copper current collector, drying for 24 hours at room temperature and atmospheric pressure, and then vacuum-drying at 70° C.

FIG. 4 illustrates the working principle of the silicon microparticle electrode (PR-PAA-SiMP). As the cross-linking points of PR-PAA slide along the string polymer during the volume expansion of the SiMPs, the stress applied to the polymer is distributed evenly. Accordingly, the polymer can be extended without breaking and can maintain the adhesion of the micronized silicon pieces. Further, the arrangement of the ring molecules becomes non-uniform as the size of the polymer is increased. Because the ring molecules brought closer are entropically unstable, repulsive force is exerted to restore the polymer to its original state. As the volume of silicon is decreased due to the repulsive force, the PR-PAA also shrinks and high structural stability is maintained. As the gap between the micronized silicon pieces is maintained continuously by the elasticity of the PR-PAA, a stable solid electrolyte interface is formed.

In contrast, FIG. 5 shows the working principle of a PAA-SiMP electrode. Since the existing binder (PAA) cannot relieve the stress caused by the expansion of SiMPs, the binder is ruptured and micronized silicon pieces are lost. This results in reduced capacity and continuous depletion of the electrolyte as the distance between micronized silicon pieces increases and an additional solid electrolyte interface is formed therebetween.

Preparation of Cell

A half-cell type coin cell was prepared using the electrode prepared above. After further placing a separator and lithium metal on the electrode, 1.0 M $LiPF_6$ in ethylene carbonate (EC)/diethylene carbonate (DEC) containing 0.5 wt % vinylene carbonate (VC) and 7.5 wt % fluoroethylene carbonate (FEC) and mixed at a weight ratio of 1:1 was injected as the electrolyte.

(Comparative Example) Preparation of Polymer Binder, Electrode and Cell Using PAA A polymer binder, an electrode and a cell were prepared in the same way as in Example using PAA instead of the PR-PAA.

(Test Example 1) Mechanical Properties

FIG. 6 shows a stretching test result for Example (polyrotaxane-polyacrylic acid; PR-PAA) and Comparative Example (polyacrylic acid). It can be seen that whereas Comparative Example using the PAA shows an r-shaped curve, Example shows an r-shape curve initially (between point 1 and point 2) and then a J-shape curve thereafter (between point 2 and point 3). This confirms the fact that, whereas Comparative Example shows an r-shaped curve as the hydrogen bond of the PAA polymer is broken when it is stretched by approximately 40%, Example shows a J-shaped curve since the cross-linking points move effectively when the hydrogen bond of PAA is broken, resulting in significant decrease in Young's modulus due to stress relaxation and stretching to about 390%.

FIG. 7 shows a stretching-compression test result for the polyrotaxane-polyacrylic acid polymer thin film according to one embodiment of the present disclosure. A result of repeating stretching-compression tests for the PR-PAA polymer 9 times with a strain of 100%, 150% or 200% is shown. It can be seen that a J-shaped curve is achieved as the stretching-compression tests are repeated, which is due to the movement of the molecular pulleys.

(Test Example 2) Measurement of Size of Silicon Microparticle

FIG. 8 shows a result of measuring the particle size distribution of the silicon microparticles according to one embodiment of the present disclosure, and FIG. 9 shows a surface SEM image of the silicon microparticles according to one embodiment of the present disclosure. From FIG. 8 and FIG. 9, it can be seen that the size of the silicon particles is 3.2 μm.

(Test Example 3) Cycle Characteristics and Coulombic Efficiency

A result of measuring the performance of a secondary battery by applying the PR-PAA and PAA polymers as a binder to a silicon microparticle negative electrode is shown in FIG. 10 and FIG. 11.

FIG. 10 shows the cycle characteristics and Coulombic efficiency of the PR-PAA-SiMP and the cycle characteristics of the PAA-SiMP at a silicon weight of 0.75 mg $cm^{-1}$ and a current density of 0.2 C (600 mA $g_{-1}$). It can be seen that, whereas the electrode of Comparative Example (PAA-SiMP) prepared using the PAA as a binder showed low cycle retention rate of 25% after 50 cycles, the electrode of Example (PR-PAA-SiMP) prepared using the PR-PAA as a binder had excellent cycle characteristics of 95% of retention of up to 100 cycles.

FIG. 11 shows the cycle characteristics and Coulombic efficiency of the PR-PAA-SiMP at a silicon weight of 1.40 mg $cm^{-1}$ and a current density of 0.2 C (600 mA $g^{-1}$). The test result confirms that the electrode operates very stably under the same capacity condition (~3 mAh/$cm^2$) as the commercially available graphite electrode.

(Test Example 4) SEM Analysis of Electrodes According to Example and Comparative Example In order to analyze the cause of the superior electrochemical characteristics of the PR-PAA binder according to the present disclosure, SEM analysis was carried out for the electrodes after 50 cycles.

FIG. 12 shows the SEM images of the electrodes according to Example of the present disclosure (PR-PAA) and Comparative Example (PAA). a) and b) are the SEM images of the electrodes of Example and Comparative Example, respectively, c) and e) are the images for the secondary electron (SE) and backscattered electron (BSE) modes of Example, respectively, and d) and f) are the images for the secondary electron (SE) and backscattered electron (BSE) modes of Comparative Example, respectively.

From the cross-sectional image analysis result of the electrodes, it was confirmed that, whereas the electrode structure was collapsed due to delamination for Comparative Example (FIG. 12b), the electrode of Example was maintained stably (FIG. 12a).

BSE mode analysis was conducted to investigate the morphology of the silicon microparticles after the 50 cycles more clearly. This technique represents the contrast in images differently depending on the kind of elements. An element with a higher atomic number is represented with higher contrast. Therefore, the morphology of the silicon particles can be investigated clearly since only the silicon particles appear bright. As a result of applying this technique, it was confirmed that, although the micronization of the silicon microparticles could not be prevented for the two electrodes, a stable interface was maintained for Example by the micronized particles in aggregate forms (FIG. 12c, 12e). In contrast, for the electrode of Comparative Example, the particles were collapsed and scattered, and a thick SEI was formed by an unstable interface (FIG. 12d, 12f).

INDUSTRIAL APPLICABILITY

The present disclosure is industrially applicable as an electrode binder for a lithium secondary battery.

The invention claimed is:

1. A polymer binder comprising:
a polymer based on a rotaxane structure comprising a ring molecule as a host molecule, a string polymer as a guest molecule, and a stopper molecule at each end of the string polymer for preventing dissociation of the ring molecule from the string polymer,
wherein the ring molecule consists of cyclodextrin covalently cross-linked to a polyacrylic acid binder for acting as a molecule moving pulley.

2. The polymer binder according to claim 1, wherein the rotaxane is a supramolecular structure comprising:
the ring molecule;
the string polymer, wherein the string polymer is a linear-type, branched-type, graft-type, dendrimer-type, or network-type polymer, and comprises at least one selected from the group consisting of an ether (—O—), a hydrocarbon (—CH$_2$—), an aromatic (—C$_6$H$_4$—), and a siloxane (—Si—O—); or is a conductive polymer selected from polyaniline (—C$_6$H$_4$N—) or poly-3,4-ethylenedioxythiophene (PEDOT); and
the stopper, wherein the stopper is any molecule whose diameter is larger than an inner diameter of the ring molecule.

3. An electrode comprising:
the polymer binder according to claim 1; and
one or more of active material selected from the group consisting of a silicon-containing composite, a tin-containing composite, a germanium-containing composite, a phosphorus-containing composite, a lead-containing composite, a sulfur-containing composite, a zinc-containing composite, an arsenic-containing composite, a carbon-based material, a silicon oxide-based molecule (SiO$_x$, 0<x<2), a metal oxide-based molecule, a metal sulfide-based molecule and a lithium metal oxide-based molecule.

4. The electrode according to claim 3, wherein each of the composite comprises one or more active elements.

5. The electrode according to claim 3, wherein the carbon-based material is selected from the group consisting of graphite, graphene, acetylene carbon, carbon nanotube, hard carbon and amorphous carbon.

6. The electrode according to claim 3, wherein the active material is selected from the group consisting of the silicon oxide-based molecule, the metal oxide-based molecule, the metal sulfide-based molecule and the lithium metal oxide-based molecule.

7. The electrode according to claim 3, the metal oxide-based molecule is selected from the group consisting of TiO$_2$, WO$_2$, FeO$_2$, Fe$_2$O$_3$, CoO$_2$, NiO, CuO, Cr$_2$O$_3$, MoO$_2$, MoO$_3$, Mn$_3$O$_4$, SnO, SnO$_2$, ZnO, In$_2$O$_3$ and Ag$_2$O.

8. The electrode according to claim 3, the lithium metal oxide-based molecule is selected from the group consisting of lithium manganese oxide, lithium cobalt oxide, lithium nickel manganese cobalt oxide, lithium nickel cobalt aluminum oxide and lithium titanium oxide.

9. The electrode according to claim 3, the metal sulfide-based molecule is selected from the group consisting of TiS$_2$ and MoS$_2$.

10. The electrode according to claim 3, wherein a weight ratio of the polymer binder:the active material is 1:1 to 1000.

11. The electrode according to claim 3, wherein the active material has a particle size of 0.001 μm to 100 μm.

12. A lithium secondary battery comprising a lithium metal oxide-based molecule in the electrode according to claim 3.

* * * * *